United States Patent
Irwin et al.

(10) Patent No.: US 9,182,019 B2
(45) Date of Patent: Nov. 10, 2015

(54) THERMOFORMING TRIM PRESS

(71) Applicant: Jere F. Irwin, Yakima, WA (US)

(72) Inventors: Jere F. Irwin, Yakima, WA (US); Dale L. Vantrease, Naches, WA (US)

(73) Assignee: Jere F. Irwin, Yakima, WA (US)

( * ) Notice: Subject to any disclaimer, the term of this patent is extended or adjusted under 35 U.S.C. 154(b) by 313 days.

(21) Appl. No.: 13/741,223

(22) Filed: Jan. 14, 2013

(65) Prior Publication Data

US 2013/0180347 A1 Jul. 18, 2013

Related U.S. Application Data

(60) Provisional application No. 61/586,688, filed on Jan. 13, 2012.

(51) Int. Cl.

| | |
|---|---|
| *F16H 19/02* | (2006.01) |
| *F16H 1/20* | (2006.01) |
| *F16H 37/06* | (2006.01) |
| *B29C 51/38* | (2006.01) |
| *B30B 15/00* | (2006.01) |
| *B30B 1/14* | (2006.01) |
| *F16H 1/14* | (2006.01) |
| *F16H 21/24* | (2006.01) |

(52) U.S. Cl.
CPC ............... *F16H 19/02* (2013.01); *B29C 51/38* (2013.01); *F16H 1/20* (2013.01); *F16H 37/065* (2013.01); *B30B 1/14* (2013.01); *B30B 15/0064* (2013.01); *F16H 1/14* (2013.01); *F16H 21/24* (2013.01); *Y10T 74/18248* (2015.01); *Y10T 74/19088* (2015.01)

(58) Field of Classification Search
CPC ........... F16H 19/02; F16H 1/20; F16H 21/24; F16H 1/14; F16H 37/065; F16H 21/48; F16H 7/02; F16H 55/36; B29C 51/38; Y10T 74/19088; Y10T 74/18248
USPC ............ 74/25, 664, 665 R, 665 GB, 665 GE; 100/281–283
See application file for complete search history.

(56) References Cited

U.S. PATENT DOCUMENTS

| | | | | |
|---|---|---|---|---|
| 1,473,455 | A | * | 11/1923 | Bailey ........................... 100/282 |
| 2,727,573 | A | * | 12/1955 | Ott ................................. 100/282 |
| 2,822,696 | A | * | 2/1958 | Staecker et al. .................. 74/44 |
| 2,882,753 | A | * | 4/1959 | Pakosh .............................. 474/4 |

(Continued)

*Primary Examiner* — William Kelleher
*Assistant Examiner* — Bobby Rushing, Jr.
(74) *Attorney, Agent, or Firm* — Wells St. John P.S.

(57) ABSTRACT

A thermoforming trim press and a drive assembly for a thermoforming trim press are provided. The drive assembly includes a frame, a drive motor, a drive linkage, a first bevel gear, and a second bevel gear. The drive motor is supported by the frame. The first bevel gearbox is supported by the frame and has an input shaft coupled with a drive gear, an output shaft coupled with a ring gear, and a housing supporting the input shaft, the output shaft, the drive gear and the output shaft in meshed gear rotation. The second bevel gearbox is supported by the frame in opposed relation with the first bevel gearbox and has an input shaft coupled with a drive gear, an output shaft coupled with a ring gear, and a housing supporting the input shaft, the output shaft, the drive gear and the output shaft in meshed gear rotation, the second bevel gearbox driven via the drive linkage with the output shaft driving in counter-rotation relative to the output shaft of the first bevel gearbox. A method for driving a moving platen on a trim press is also provided using opposed, identical beveled gearboxes.

11 Claims, 14 Drawing Sheets

(56) References Cited

U.S. PATENT DOCUMENTS

| | | | |
|---|---|---|---|
| 3,808,912 A * | 5/1974 | Voorhees et al. | 74/604 |
| 3,858,432 A * | 1/1975 | Voorhees et al. | 72/455 |
| 4,095,522 A * | 6/1978 | Drungil | 100/214 |
| 5,225,213 A * | 7/1993 | Brown et al. | 425/292 |
| 6,067,886 A * | 5/2000 | Irwin | 83/615 |
| 6,200,122 B1 * | 3/2001 | Chun et al. | 425/136 |

* cited by examiner

THERMOFORMING TRIM PRESS

CROSS REFERENCE TO RELATED APPLICATION

This application claims priority to U.S. Provisional Patent Application Ser. No. 61/586,688 which was filed on Jan. 13, 2012, the entirety of which is incorporated by reference herein.

TECHNICAL FIELD

The presently disclosed subject matter pertains to apparatus and methods for separating thermoformed articles from a sheet of material in which they have been formed. More particularly, the presently disclosed subject matter relates to apparatus and methods for driving a trim press platen in reciprocating motion during an article severing operation.

BACKGROUND OF THE INVENTION

Techniques are known for severing articles from a sheet of plastic material, particularly plastic sheet material. Improvements are needed in how a trim press platen is driven in reciprocation to increase operating life of the drive mechanism.

SUMMARY OF THE INVENTION

A thermoforming trim press and drive assembly for a thermoforming trim press are provided. The drive assembly includes a frame, a drive motor, a drive linkage, a first bevel gear, and a second bevel gear. The drive motor is supported by the frame. The first bevel gearbox is supported by the frame and has an input shaft coupled with a drive gear, an output shaft coupled with a ring gear, and a housing supporting the input shaft, the output shaft, the drive gear and the output shaft in meshed gear rotation. The second bevel gearbox is supported by the frame in opposed relation with the first bevel gearbox and has an input shaft coupled with a drive gear, an output shaft coupled with a ring gear, and a housing supporting the input shaft, the output shaft, the drive gear and the output shaft in meshed gear rotation, the second bevel gearbox driven via the drive linkage with the output shaft driving in counter-rotation relative to the output shaft of the first bevel gearbox. A method for driving a moving platen on a trim press is also provided using opposed, identical beveled gearboxes.

According to one aspect, a drive assembly for a thermoforming trim press is provided having a frame, a drive motor, a drive linkage, a first bevel gearbox, and a second bevel gearbox. The first bevel gearbox is supported by the frame and has an input shaft coupled with a drive gear, an output shaft coupled with a ring gear, and a housing supporting the input shaft, the output shaft, the drive gear and the output shaft in meshed gear rotation. The second bevel gearbox is supported by the frame in opposed relation with the first bevel gearbox, coupled for co-rotation with the first bevel gearbox through the drive linkage, and has an input shaft coupled with a drive gear, an output shaft coupled with a ring gear, and a housing supporting the input shaft, the output shaft, the drive gear and the output shaft in meshed gear rotation. The second bevel gearbox is driven via the drive linkage with the output shaft driving in counter-rotation relative to the output shaft of the first bevel gearbox.

According to another aspect, a thermoforming trim press is provided having a frame, a drive gear assembly, a stationary platen, a moving platen, and a crank arm assembly. The drive gear assembly has a drive motor communicating with a first bevel gearbox and a second bevel gearbox through a drive linkage, the first bevel gearbox supported by the frame and having an input shaft coupled with a drive gear, an output shaft coupled with a ring gear, and a housing supporting the input shaft, the output shaft, the drive gear and the output shaft in meshed gear rotation. The second bevel gearbox is supported by the frame in opposed relation with the first bevel gearbox, coupled for co-rotation with the first bevel gearbox through the drive linkage, and has an input shaft coupled with a drive gear, an output shaft coupled with a ring gear, and a housing supporting the input shaft, the output shaft, the drive gear and the output shaft in meshed gear rotation. The second bevel gearbox is driven via the drive linkage with the output shaft driving in counter-rotation relative to the output shaft of the first bevel gearbox. The moving platen is configured to reciprocating to and fro relative to the stationary platen. The crank arm assembly is coupled between each end of each output shaft and a respective pivotal coupling with the platen and configured to move the platen in reciprocating axial movement.

According to even another aspect, a method is provided for reciprocating a moving platen on a thermoforming trim press. The method includes: providing a frame; a drive motor supported by the frame; a drive linkage comprising one of: 1) a synchronizing belt, and 2) a synchronizing chain, a first bevel gearbox supported by the frame and having an input shaft coupled with the drive linkage, an output shaft coupled with a ring gear, and a housing supporting the input shaft, the output shaft, the drive gear and the output shaft in meshed gear rotation, and a second bevel gearbox supported by the frame in opposed relation with the first bevel gearbox, coupled for co-rotation with the first bevel gearbox through the drive linkage, and having an input shaft coupled with a drive gear, an output shaft coupled with a ring gear, and a housing supporting the input shaft, the output shaft, the drive gear and the output shaft in meshed gear rotation, the second bevel gearbox driven via the drive linkage with the output shaft driving in counter-rotation relative to the output shaft of the first bevel gearbox; driving the first bevel gearbox and the second bevel gearbox in synchronization with the drive linkage; and rotating the output shaft of the first bevel gearbox and the output shaft from the second bevel gearbox in synchronized counterrotation.

BRIEF DESCRIPTION OF THE DRAWINGS

Preferred embodiments of the disclosure are described below with reference to the following accompanying drawings.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Figure 1:
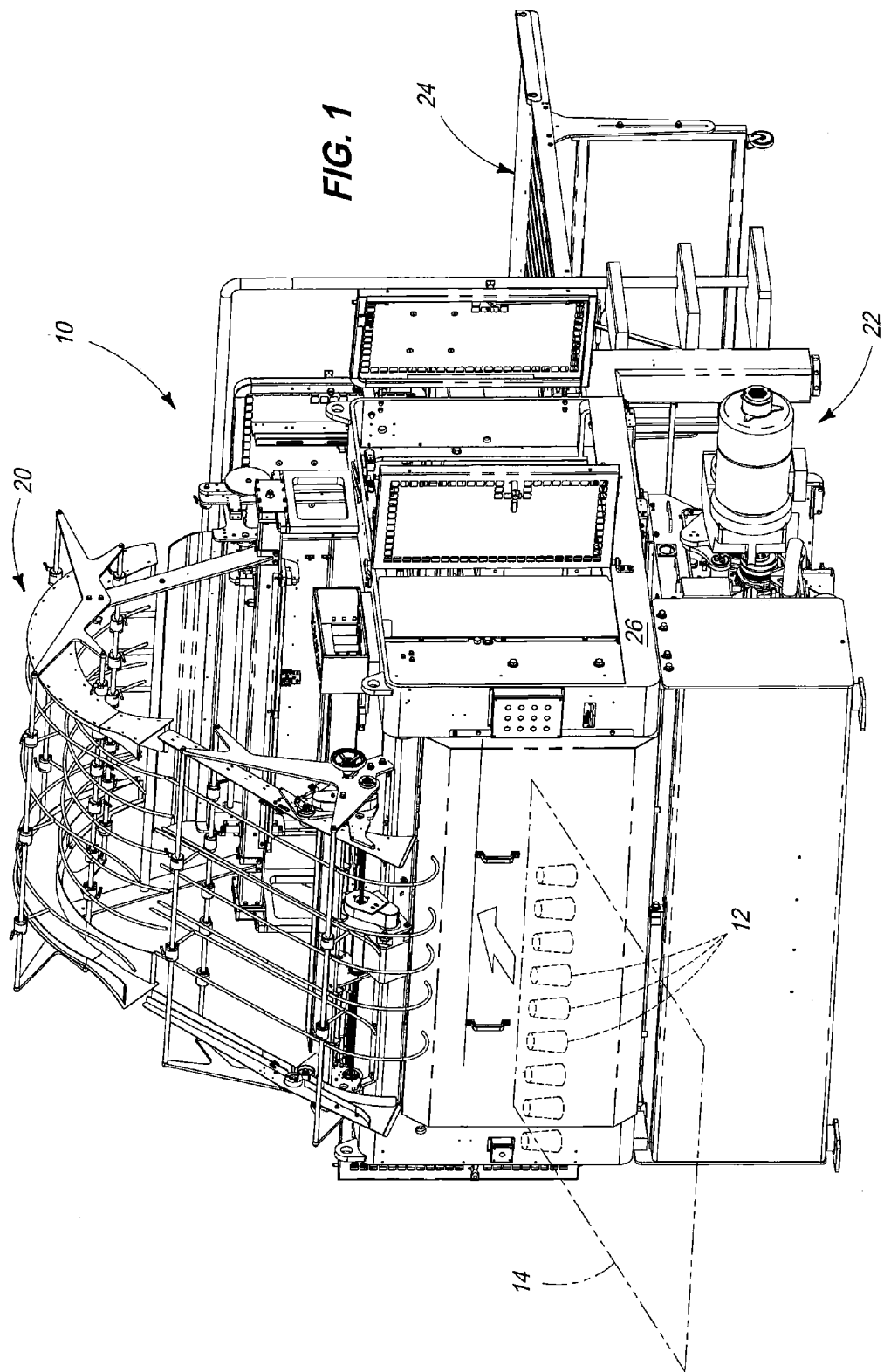
FIG. 1 is a schematic perspective view from an entrance end of a thermoforming machine trim press having improved drive motor and gearbox assembly features in accordance with one embodiment.

FIG. 1 is a first exemplary embodiment implemented on a thermoforming machine trim press 10. Trim press 10 is positioned downstream of a thermoforming machine (not shown) for separating individual formed articles 12 from a sheet, or web 14 of thermoformable material. A guide canopy 20 is supported atop trim press 10 to guide web 14 and articles 12 into trim press 10 for severing articles 12 from web 14 via an intermittent cyclical severing operation. After severing articles 12, a remaining scrap portion of web 14 is delivered into a comminuting apparatus 22 provided beneath trim press 10 for severing, subdividing, and recycling of web 14. Separated articles 24 are then delivered from trim press 10 onto an exit table 24 for further delivery, stacking and packaging. Canopy 20, comminuting apparatus 22, and table 24 can be affixed onto or mated with a frame 26 of trim press 10.

Figure 2:
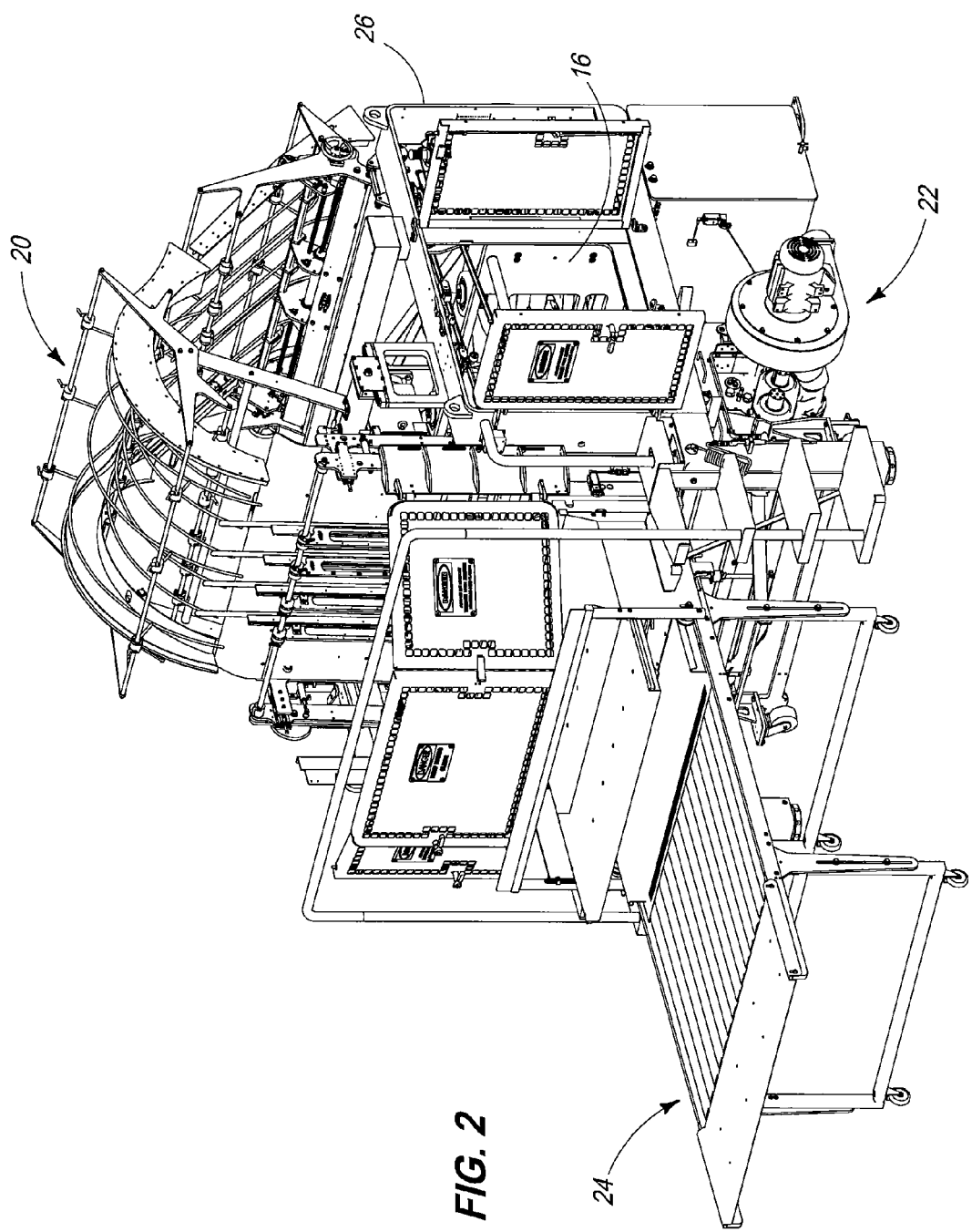
FIG. 2 is a schematic perspective view from an exit end of the thermoforming machine trim press of FIG. 1.

FIG. 2 is a schematic perspective view from an exit end of the thermoforming machine trim press of FIG. 1 further illustrating arrangement between canopy 20, comminuting apparatus 22, and table 24 relative to frame 26 of trim press 20.

Figure 3:
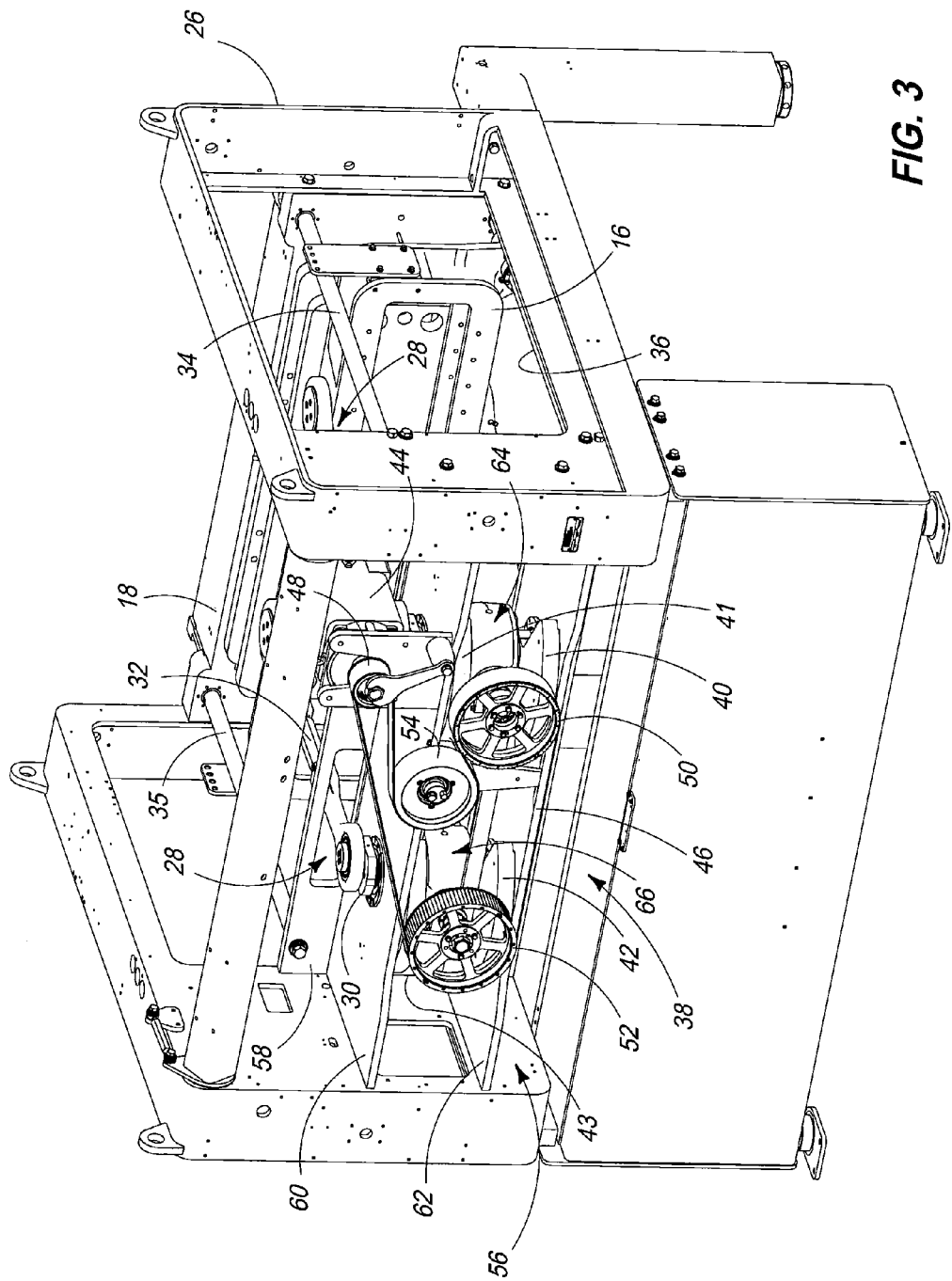
FIG. 3 is a schematic perspective view from an entrance end with portions removed of the thermoforming machine trim press of FIGS. 1-2.

FIG. 3 illustrates trim press 10 from an entrance end with portions removed, showing a horizontally configured trim press 10 having a moving platen 16 and a stationary platen 18 between which a web having thermoformed articles is passed between in order to sever the articles from the web. Complementary coacting cutting dies (not shown) are affixed to platens 16 and 18. Two pairs of crank arm assemblies 28 support and drive moving platen 16 relative to frame 26 for horizontal reciprocation relative to stationary platen 18. A drive motor and gearbox assembly, or drive assembly 38 drives moving platen 16 in reciprocation, while platen 16 is further guided along a pair of platen die posts 36 and 37 (see FIG. 4) via bronze bushings 82 and 84 (see FIG. 9). Platen die posts 36 and 37, along with treadle die posts 34 and 35 support stationary platen 18 relative to frame 26 and moving platen 16.

As shown in FIG. 3, drive motor and gearbox assembly 38 is supported in a central location within frame 26 (relative to moving platen 16), with crank arm assemblies 28 applying load along medial, or inboard portions of platen 16 (relative to outer edges along the major axis), so as to minimize flexing of platen 16 under load that might otherwise increase wear on respective die cutting edges (not shown). More particularly, assembly 38 is mounted behind a base plate 58 and between a pair of side plates 60 and 62. Plates 58, 60 and 62 form a subframe 56 of frame 26. Because of the desirable central, or medial location of crank arm assemblies 28 relative to moving platen 16, there exists restricted, or limited space for mounting assembly 38 between crank arm assemblies 28 and plates 58, 60 and 62.

Drive motor and gearbox assembly (or drive gear assembly) 38 includes a servo drive motor 44, a drive pulley, or wheel 48 on motor 44, a timing (or drive) belt 46, timing pulleys (or wheels) 50 and 52, and follower pulley (or wheel) 54. Optionally, belt 46 and pulleys 50, 52 can be replaced with a synchronized chain and sprockets. Accordingly, in operation, motor 44 drives pulleys 50 and 52 in the same direction of rotation, or co-rotation, thereby driving respective spiral bevel gearboxes 64 and 66 with the same rotation. However, gearboxes are identical, except that gearbox 66 is turned 180 degrees in orientation to face gearbox 64 which causes respective output shafts 74 and 76 (see FIG. 8) to rotate in opposed counter-rotation. According to one construction, servo drive motor 44 comprises a model E30-1FT6132-6SC71-4DA0 SIEMENS 1FT6 SERVO MOTOR W/DRIVE CLIQ 27HP 973IN/LB 2000 RPM FAN COOLED servo motor available from Siemens AG. Automation Group, Automation Systems for Machine Tools, Robots and Special-Purpose Machines, P.O. Box 31 AD, D-91050, Erlangen, Federal Republic of Germany.

As shown in FIG. 3, a pair of eccentric counterbalance weights 40, 41 and 42, 43 are affixed to the output shaft 74 and 76 (see FIG. 8) of each gearbox 64 and 66, respectively. Weights 40 and 41 rotate in opposed, counterbalanced relation to weights 42 and 43 in directions off-axis to the axial reciprocating direction of moving platen 16. Optionally, according to another construction counterbalance weights 40-43 can be omitted.

Crank arm assemblies 28 of FIG. 3 each comprise a throw (or drive) arm 30 and a platen connecting rod 32. Each output shaft 74 and 76 (see FIG. 8) of gearbox 64 and 66, respectively, is supported for rotation in a bearing assembly provided in side plates 60 and 62, such as bearing assemblies 78 and 80 (see FIG. 8). Gearboxes 64 and 66 are further secured together with a longitudinal cross brace 75 (see FIG. 11).

Figure 4:
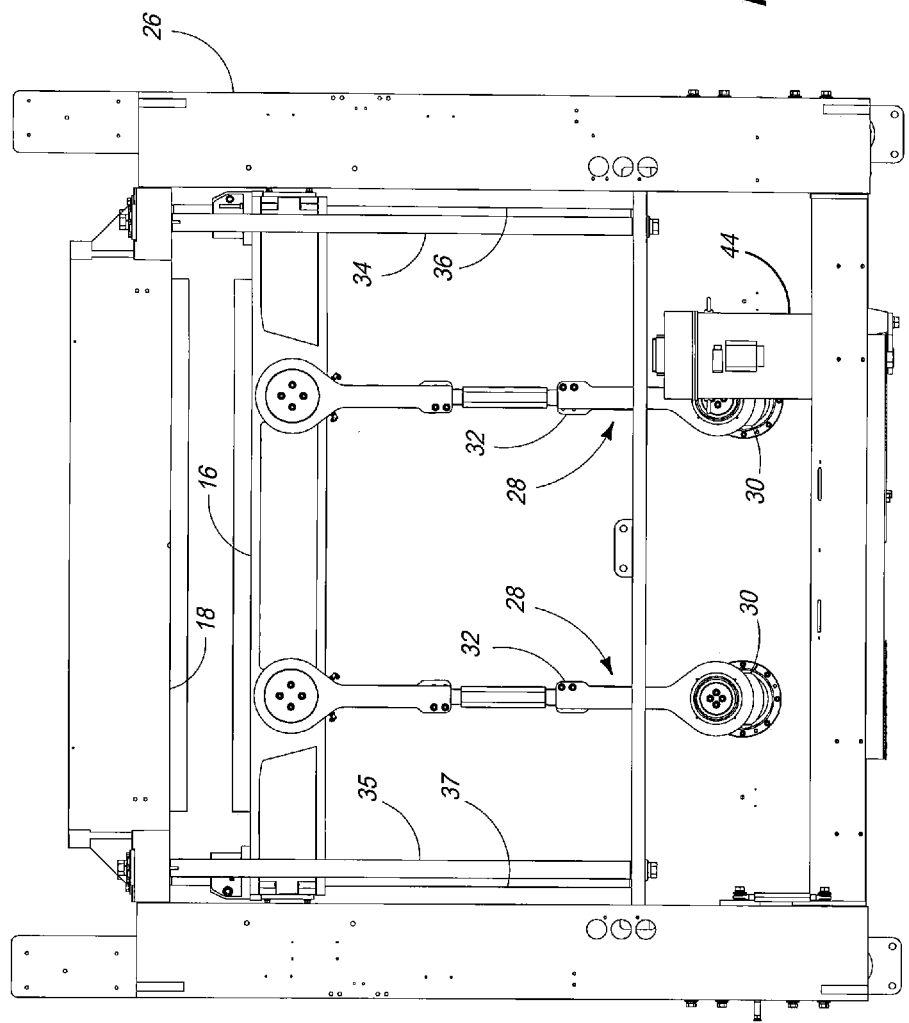
FIG. 4 is a plan view of the thermoforming machine trim press of FIG. 3.
Figure 5:
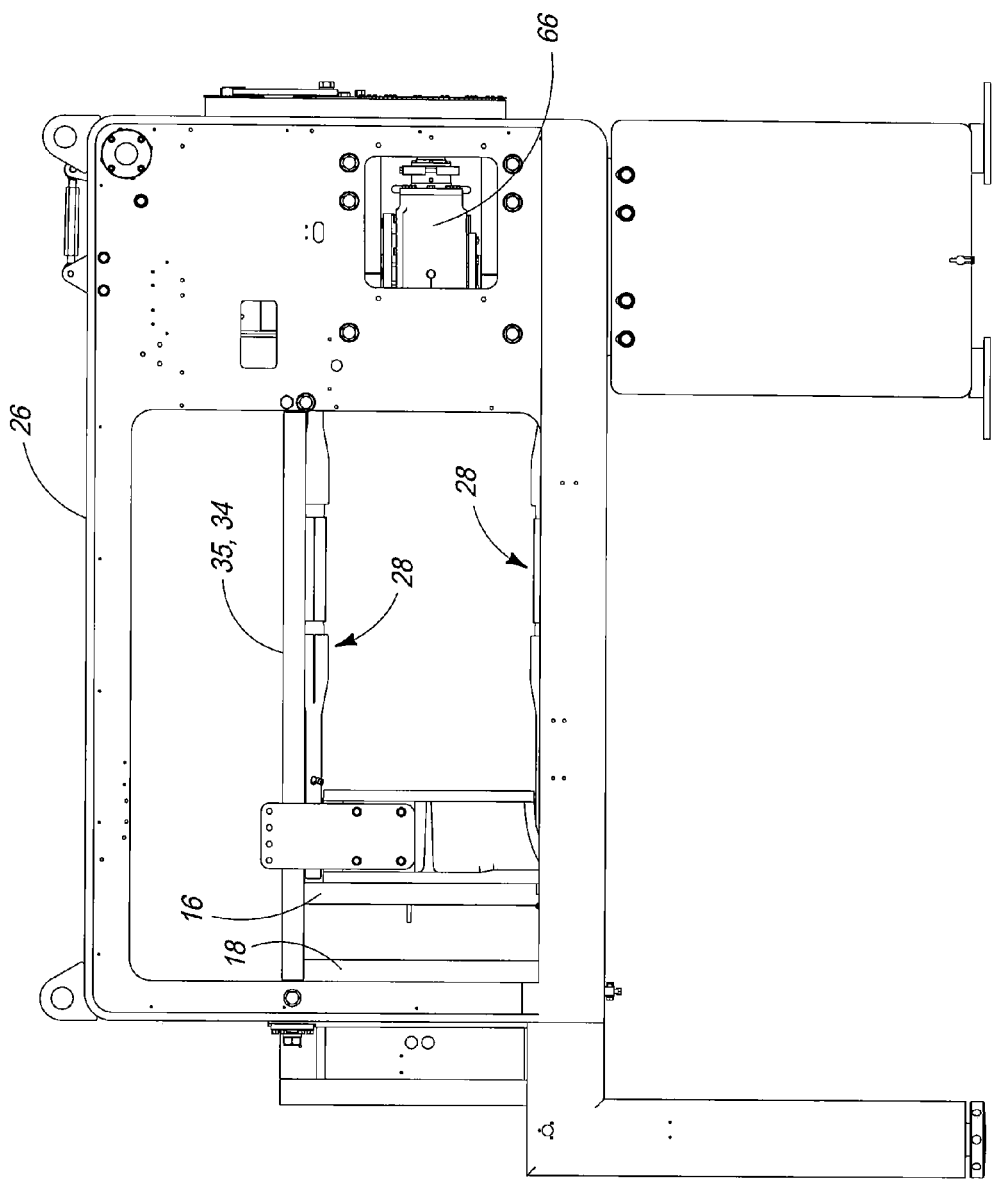
FIG. 5 is a right side view of the thermoforming machine trim press of FIGS. 3-4.
Figure 6:
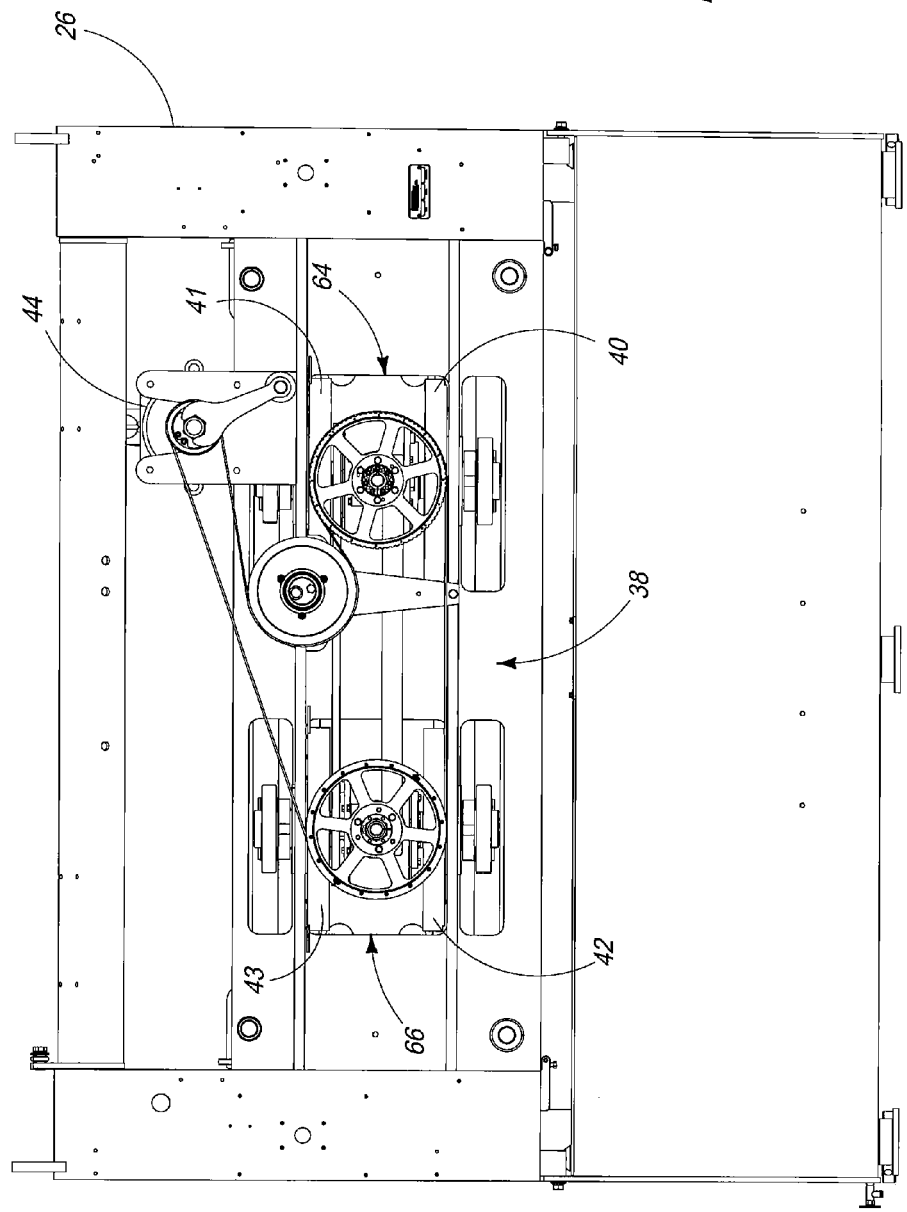
FIG. 6 is a front, entrance end view of the thermoforming machine trim press of FIGS. 3-5.
Figure 7:
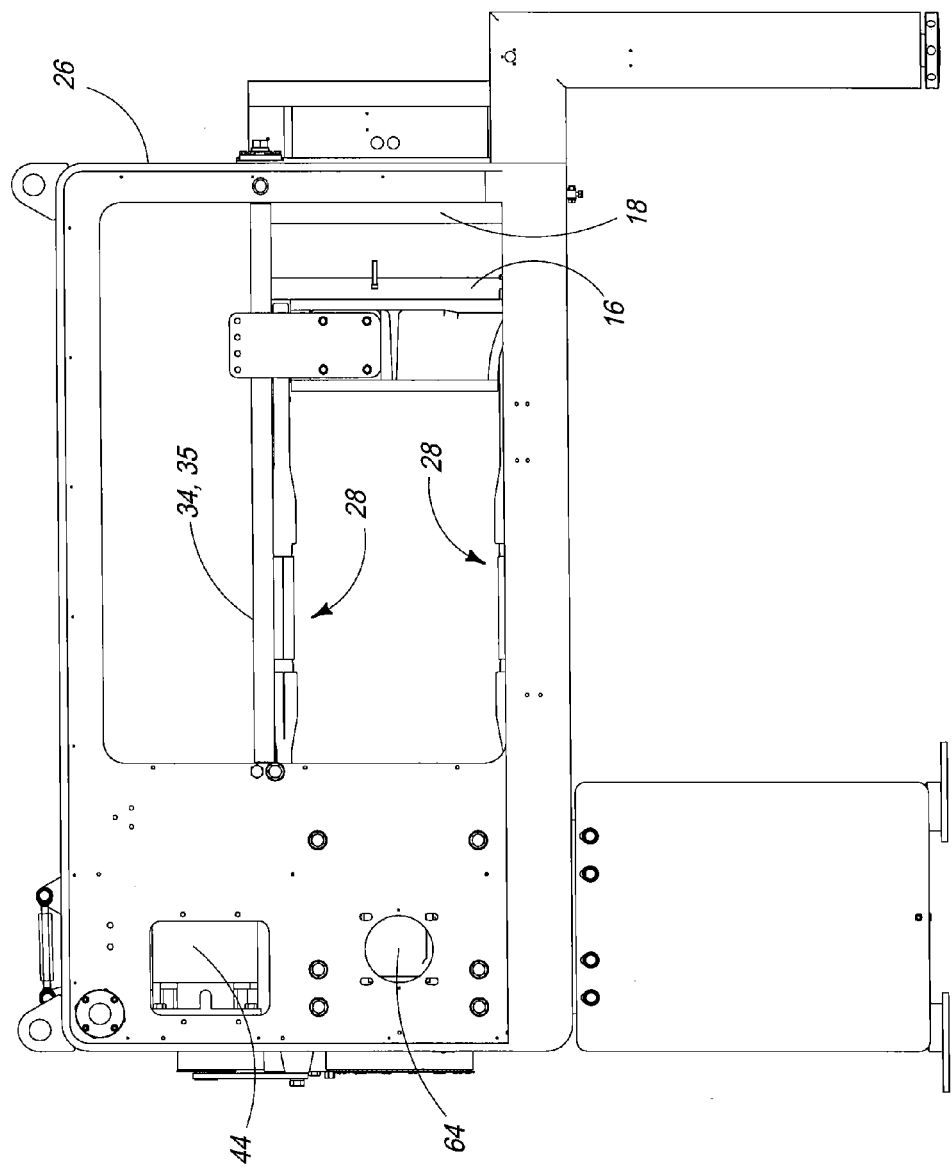
FIG. 7 is a left side view of the thermoforming machine trim press of FIGS. 3-6.

FIGS. 4-7 illustrate top, right side, front and left side views of the thermoforming machine trim press of FIG. 3. FIGS. 4, 5 and 7 depict orientation of treadle die posts 34-35 and platen die posts 36-37. FIGS. 4, 6 and 7 show positioning of motor 44 within frame 26. FIGS. 5-6 depict positioning of gearbox 66, and FIGS. 6-7 depict positioning of gearbox 64. Furthermore, components of drive motor and gearbox assembly 38 are shown in front end view in FIG. 6, relative to motor 44, gearboxes 64 and 66, and counterbalance weights 40-41 and 42-43.

Figure 8:
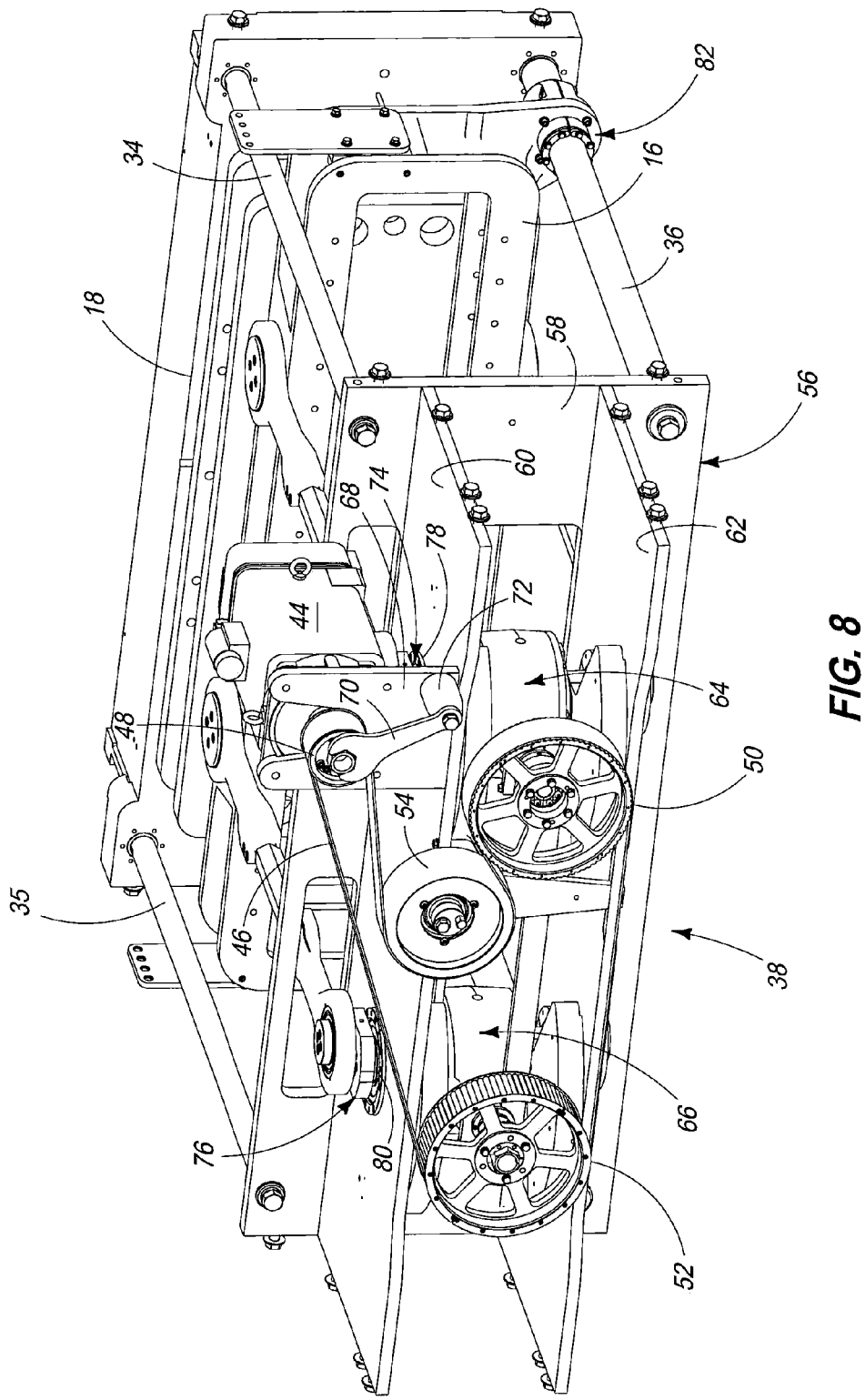
FIG. 8 is a schematic perspective view of the thermoforming machine trim press assembly of FIG. 3, but with frame components further removed.

FIG. 8 is a schematic perspective view of the thermoforming machine trim press assembly of FIG. 3, but with various frame components removed. As shown in FIG. 8, output shafts 74 and 76 of gearboxes 64 and 66 are each supported at opposite ends by bearing assemblies mounted into side plates 60 and 62, such as bearing assemblies 78 and 80. An identical pair of bearing assemblies are also mounted in side plate 62, but are not numbered or visible. Motor 44 drives timing belt 46 so as to co-rotate toothed input pulley 50 and 52 on an input shaft of each gearbox 64 and 66. According to one construction, gearboxes 64 and 66 are identical, but gearbox 66 is rotated in an opposite direction to impart counter-rotation of output shafts 74 and 76 which produces counterbalance of dynamic forces (whether or not weights 40-43 are provided). Limited space for mounting is provided between plates 60 and 62 due to a desire to centrally position driving forces being delivered to moving platen 16. Gearboxes 64 and 66 each comprise spiral bevel gears. One such suitable gearbox is a Model 920 bevel gear drive sold by Hub City, Inc., Factory Sale, 2914 Industrial Ave., P.O. Box 1089, Aberdeen, S. Dak. 57402-1089. It has been found that use of such a gearbox in opposed pairs significantly increases the operating life of trim press 10 and reduces any need for maintenance and replacement of alternative worm gearboxes, which have been previously used on trim presses. By placing the same gearboxes 64 and 66 in opposed relation, the need for two unique gearboxes is also eliminated. According to one construction, both gearboxes 64 and 66 can have a right hand spiral bevel gear. Alternatively, both gearboxes 64 and 66 can have a left hand spiral bevel gear.

Figure 9:
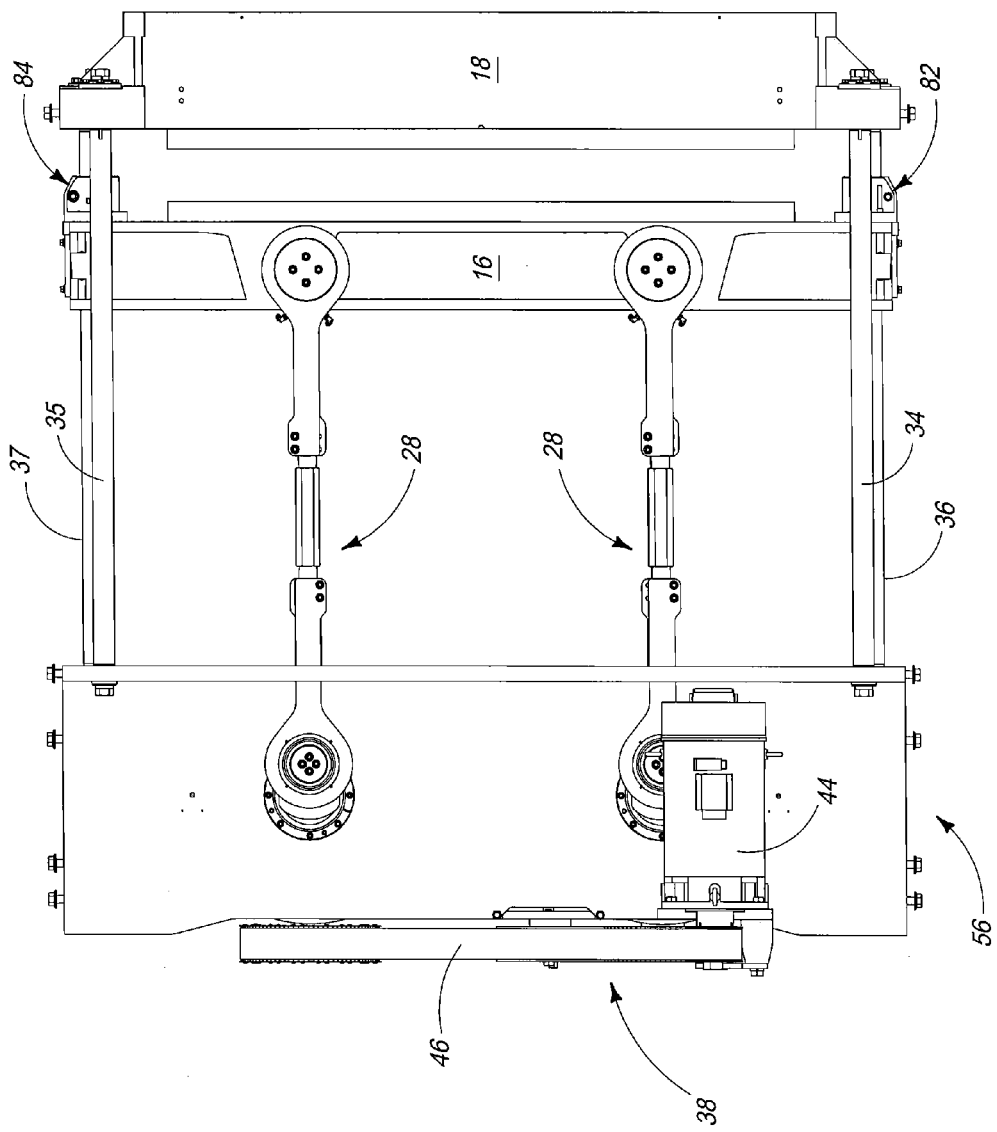
FIG. 9 is a plan view of the thermoforming machine trim press assembly of FIG. 8.
Figure 10:
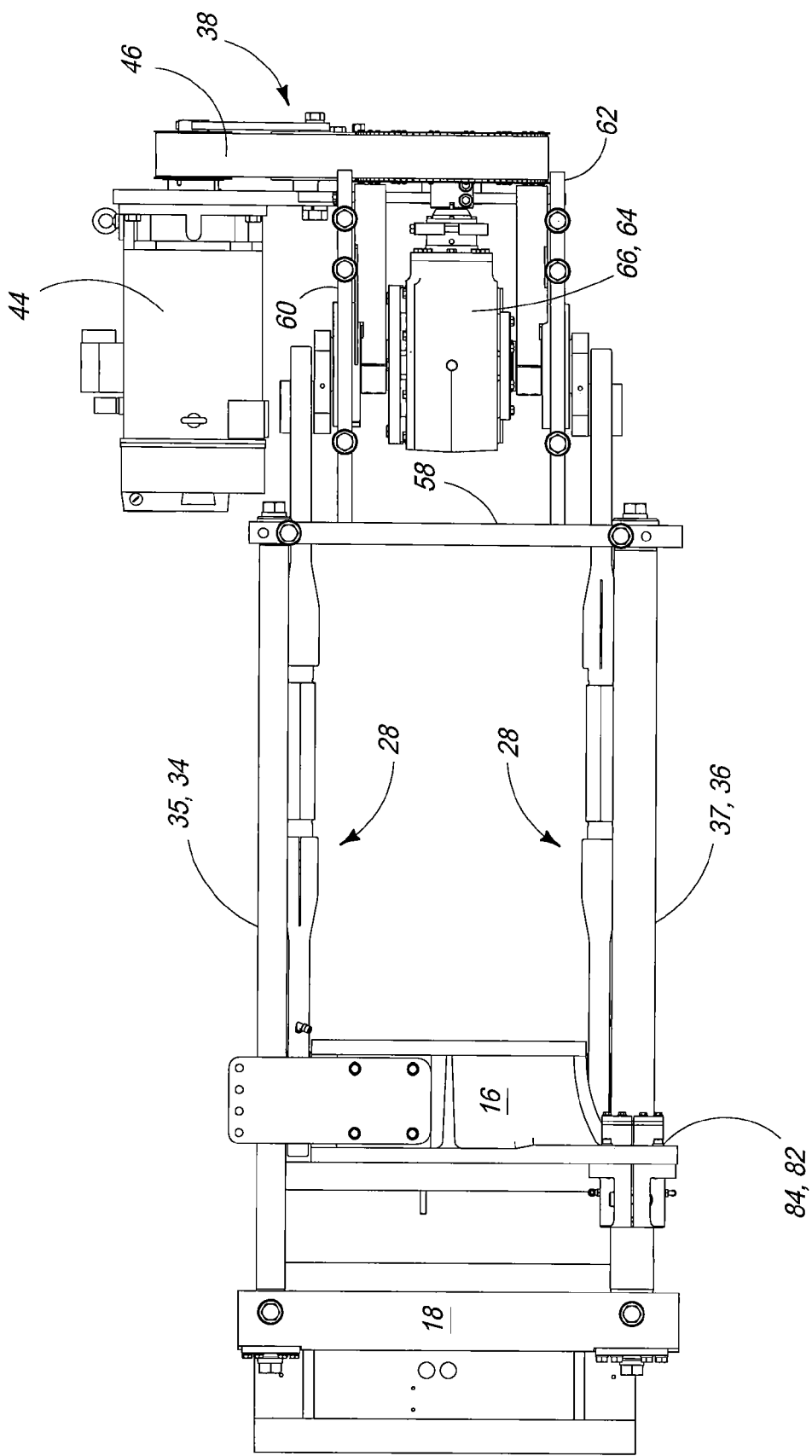
FIG. 10 is a right side view of the thermoforming machine trim press assembly of FIGS. 8-9.
Figure 11:
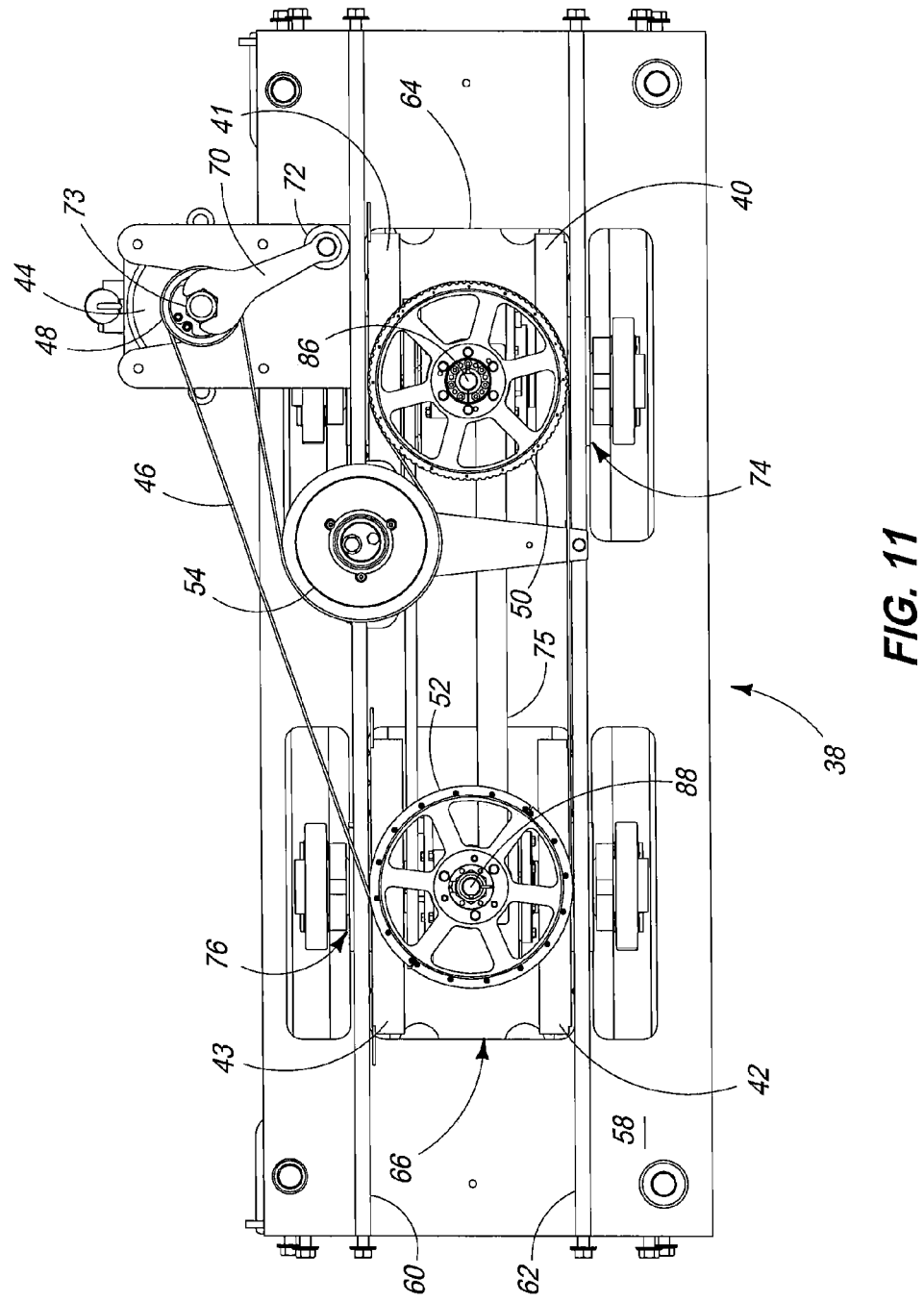
FIG. 11 is a front, entrance end view of the thermoforming machine trim press assembly of FIGS. 8-10.
Figure 12:
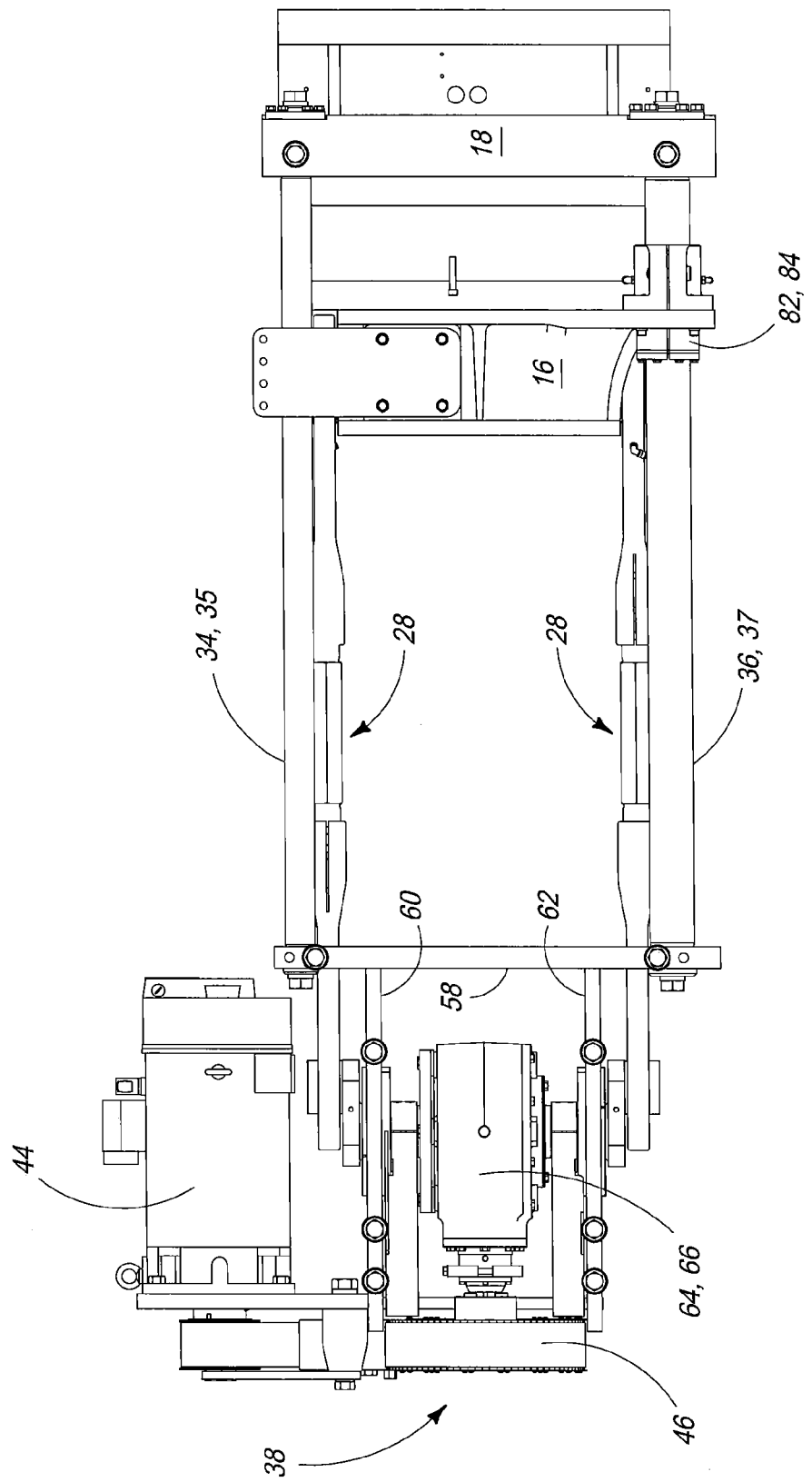
FIG. 12 is a left side view of the thermoforming machine trim press assembly of FIGS. 8-11.

FIGS. 9-12 variously illustrate orientation of components on assembly 38 relative to moving platen 16 and stationary platen 18. FIGS. 10-12 show positioning of gearboxes 64 and 66 within frame components 60 and 62 of the trim press. FIGS. 9 and 12 show the provision of bronze bushing assemblies 82 and 84 mounted on each end of moving platen 16 for guiding reciprocating motion of platen 16 along platen die posts 36 and 37, respectively.

Figure 13:
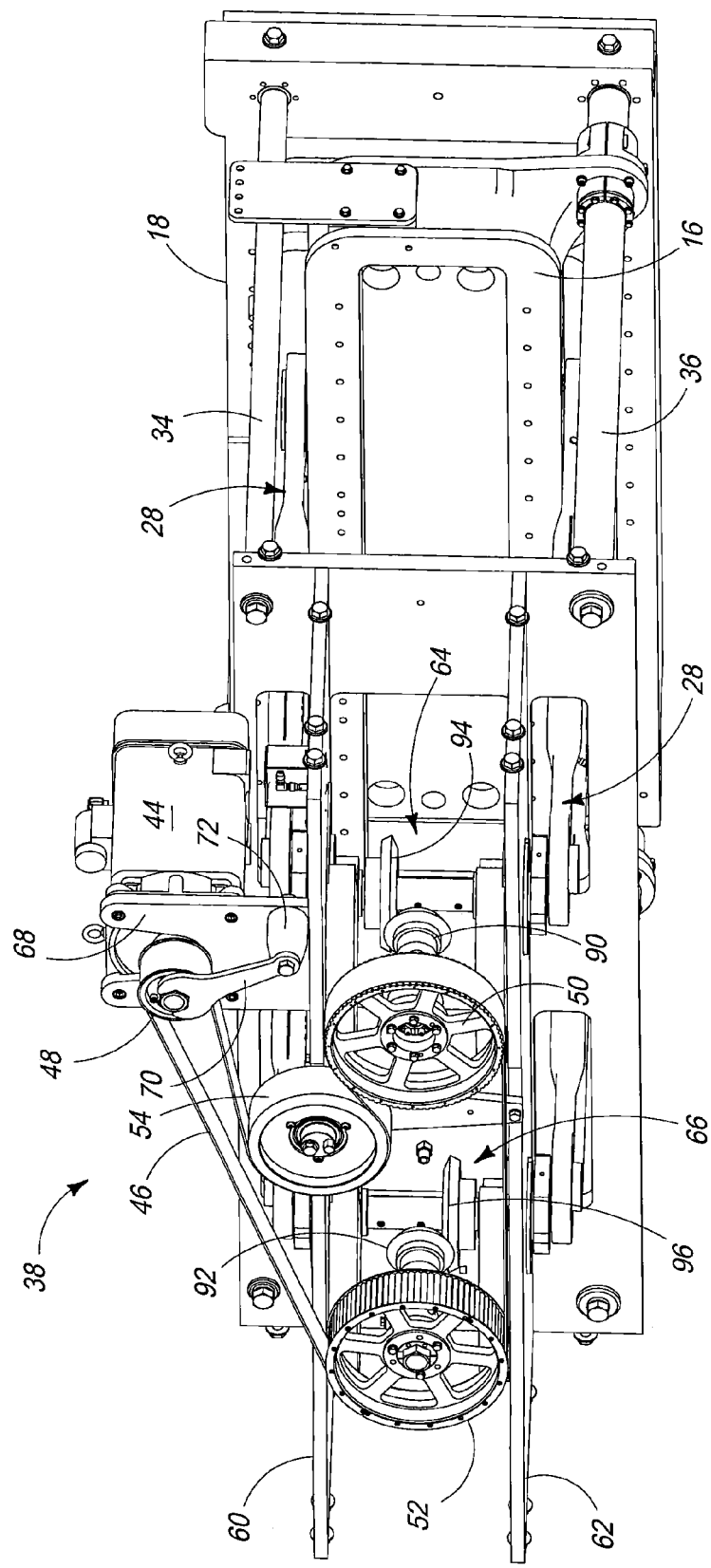
FIG. 13 is a schematic perspective view of the thermoforming machine trim press of FIG. 8 with drive gearbox housing portions removed and showing a simplified representation of respective drive and ring gears.

FIG. 13 is a schematic perspective view of the thermoforming machine trim press of FIG. 8 with drive gearbox housing portions of spiral bevel gearboxes 64 and 66 (see FIG. 8) removed and showing a simplified representation of respective drive and ring gears. More particularly, by mounting gearbox 66 in opposed relation to gearbox 64, a ring gear 96 on gearbox 66 is below a respective pinion drive gear 92 of gearbox 66. In contrast, gearbox 66 has a ring gear 94 above a respective pinion drive gear 90 of gearbox 64. Accordingly, an identical gearbox can be used for gearboxes 64 and 66 while mounting the gearboxes in a relatively compact, central location within subframe 56 (see FIG. 8), thereby reducing the number of unique components and providing significantly greater operational lifetime over worm gearboxes that are presently used on the subframe of a trim press.

Figure 14:
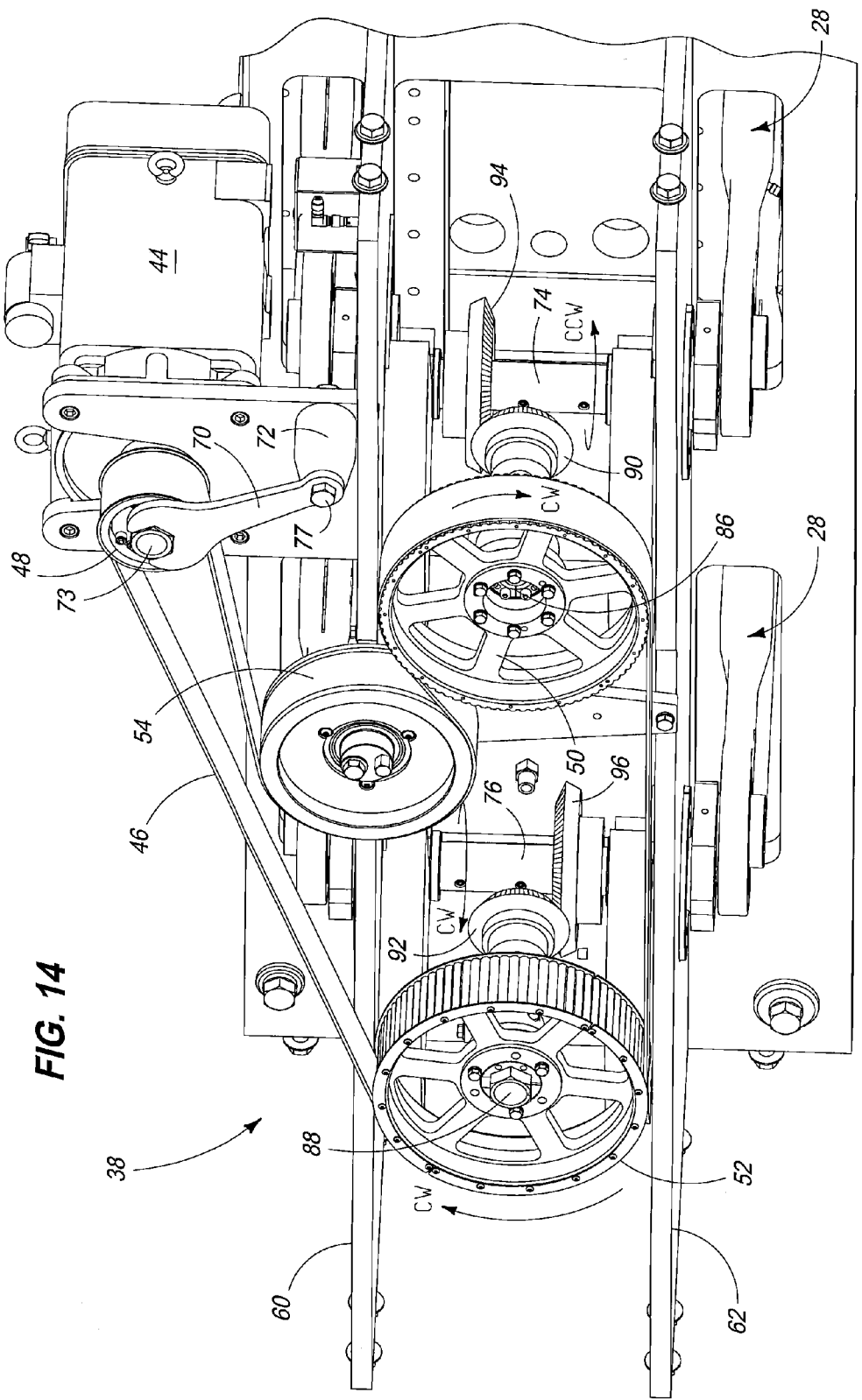
FIG. 14 is an enlarged partial schematic perspective view of the thermoforming machine trim press of FIG. 13.

As shown in FIG. 14, a nut 73 on drive pulley 48 receives an open face wrench 70 that is used during maintenance to rotate gearboxes 64 and 66 (see FIG. 13) to desired positions in order to perform maintenance of cutting dies, platens and other machine components. When not in use, wrench 70 is secured at an opposite end with a fastener 77 atop a boss 72 on mounting plate 68 (see FIG. 13). Each input drive pulley 50 and 52 has a circumferential array of teeth that intermesh with drive belt 46. Each pulley teeth that intermesh with drive belt 46. Each pulley 50 and 52 is affixed to an end of input shaft 86 and 88 of each respective gearbox.

Input drive pulley 86 is a keyless Ringfeder shaft-hub locking device, sold by RINGFEDER POWER TRANSMISSION GMBH, Werner-Heisenberg-Straβe 18, D-64823 Groβ-Umstadt, Germany and available regionally in the United States from The Smythe Company, 1025 S.E. Brooklyn Street, Portland, Oreg. 97202-2526. Input drive pulley 88 is a standard keyed shaft/hub locking device having a key slot the respective pulley and shaft, and a complementary key. The Ringfeder shaft/hub locking device enables synchronized positioning of the respective gearboxes 64 and 66 (see FIG. 11). Optionally, both input drive pulleys 50 and 52 can be affixed onto the respective input shaft (on each respective gearbox 64 and 66) using a keyless Ringfeder shaft-hub locking device.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A thermoforming trim press, comprising:
   a frame;
   a drive gear assembly having a drive motor communicating with a first bevel gearbox and a second bevel gearbox through a drive linkage, the first bevel gearbox supported by the frame and having an input shaft coupled with a drive gear, an output shaft coupled with a ring gear, and a housing supporting the input shaft, the output shaft, the drive gear and the ring gear in meshed gear rotation, and the second bevel gearbox supported by the frame in opposed relation with the first bevel gearbox, coupled for co-rotation with the first bevel gearbox through the drive linkage, and having an input shaft coupled with a drive gear, an output shaft coupled with a ring gear, and a housing supporting the input shaft, the output shaft, the drive gear and the ring gear in meshed gear rotation, the second bevel gearbox driven via the drive linkage with the output shaft driving in counter-rotation relative to the output shaft of the first bevel gearbox;
   a stationary platen;
   a moving platen configured to reciprocate to and fro relative to the stationary platen; and
   a crank arm assembly coupled between each end of each output shaft and a respective pivotal coupling with the moving platen and configured to move the moving platen in reciprocating axial movement.

2. The thermoforming trim press of claim 1, wherein the drive gear and the ring gear for the first bevel gearbox and the second bevel gearbox each comprise hardened, heat treated steel.

3. The thermoforming trim press of claim 1, further comprising a first pair of eccentric counterbalance weights affixed to the output shaft of the first bevel gearbox and a second pair of eccentric counterbalance weights affixed to the output shaft of the second bevel gearbox.

4. The thermoforming trim press of claim 1, further comprising a subframe provided centrally of the frame between the crank arm assemblies configured to carry the drive linkage and the motor.

5. The thermoforming trim press of claim 4, wherein the subframe comprises a base plate and a pair of side plates mounted perpendicular to the base plate, each side plate having a bore configured to receive a bearing assembly for receiving one end on one of the output shafts from the first bevel gearbox and the second bevel gearbox.

6. The thermoforming trim press of claim 5, further comprising a first pair of eccentric counterbalance weights affixed to the output shaft of the first bevel gearbox between the pair of side plates and a second pair of eccentric counterbalance weights affixed to the output shaft of the second bevel gearbox between the side plates.

7. The thermoforming trim press of claim 1, wherein the drive linkage comprises a drive belt, a drive pulley affixed to the drive motor and communicating with the drive belt, a first driven pulley affixed to the input shaft of the first bevel gearbox and communicating with the drive belt, a second driven pulley affixed to the input shaft of the second bevel gearbox and communicating with the drive belt, and a follower pulley communicating with the drive belt.

8. The thermoforming trim press of claim 5, wherein the first pair of eccentric counterbalance weights rotate in opposed, counterbalanced relation to the second pair of eccentric counterbalance weights in directions off-axis to the axial reciprocating direction of the moving platen.

9. The thermoforming trim press of claim 8, further comprising a pair of die posts carried by the frame parallel to the direction of axial reciprocation of the moving platen and a pair of respective bushings carried by the platen for axial sliding reciprocation along a respective one of the die posts.

10. The thermoforming trim press of claim 1, wherein one of the first input pulley and the second input pulley further comprises a keyless shaft/hub locking device provided between one of the first input pulley and the second input pulley, and one of the respective one of the input shaft of the first bevel gear box and the input shaft of the second bevel gear box configurable in assembly to enable synchronized positioning of the first bevel gear box and the second bevel gear box.

11. The thermoforming trim press of claim 10, wherein another of the first input pulley and the second input pulley further comprises a keyed shaft/hub locking device provided between another of the first input pulley and the second input pulley, and another of the respective one of the input shaft of the first bevel gear box and the input shaft of the second bevel gear box.

* * * * *